US012589355B2

(12) United States Patent    (10) Patent No.:    US 12,589,355 B2
Lin                                (45) Date of Patent:         Mar. 31, 2026

(54) METHOD FOR CAPTURING CARBON DIOXIDE AND NITROGEN OXIDES IN FLUE GAS AND CONVERSION THEREOF TO CARBON SOURCE AND NITROGEN SOURCE NEEDED FOR ALGAE GROWTH

(71) Applicant: Cheng-Jen Lin, New Taipei City (TW)

(72) Inventor: Cheng-Jen Lin, New Taipei City (TW)

( * ) Notice: Subject to any disclaimer, the term of this patent is extended or adjusted under 35 U.S.C. 154(b) by 452 days.

(21) Appl. No.: 18/192,569

(22) Filed: Mar. 29, 2023

(65) Prior Publication Data

US 2024/0216860 A1     Jul. 4, 2024

(30) Foreign Application Priority Data

Dec. 28, 2022   (TW) ................................. 111150464

(51) Int. Cl.
B01D 53/62          (2006.01)
B01D 53/50          (2006.01)
(52) U.S. Cl.
CPC ........... B01D 53/62 (2013.01); B01D 53/502 (2013.01); B01D 53/507 (2013.01)
(58) Field of Classification Search
CPC .... B01D 53/62; B01D 53/502; B01D 53/507; B01D 53/73; B01D 2251/102; B01D 2251/304; B01D 2251/604; B01D 2251/606; B01D 2252/103; B01D 2255/10; B01D 2255/1021; B01D 2257/404; B01D 2257/504; B01D 2258/0283; B01D 53/75;

(Continued)

(56) References Cited

U.S. PATENT DOCUMENTS 6,793,903 B1    9/2004  Parrish
8,580,206 B2   11/2013  Allam et al.
(Continued)

FOREIGN PATENT DOCUMENTS

CN       101977842 A     2/2011
CN       102061261 B     4/2013
(Continued)

OTHER PUBLICATIONS

Ga-Yeong Kim et al., The use of bicarbonate for microalgae cultivation and its carbon footprint analysis, Green Chemistry 2019, 21, 5053-5062.

*Primary Examiner* — Anthony J Zimmer
*Assistant Examiner* — Starfari Teshawn McClain
(74) *Attorney, Agent, or Firm* — Sinorica International Patent & Trademark

(57)                    ABSTRACT

A method for treating a flue gas, comprising: step (A) desulfurizing a flue gas to obtain a desulfurized flue gas, comprising $NO_x$, $SO_x$, and $CO_2$; step (B) providing oxygen for an oxidization to obtain an oxidized flue gas; step (C) rinsing the oxidized flue gas with water to obtain a rinsed flue gas and a nitric acid solution; and step (D) contacting the rinsed flue gas with a basic solution to absorb the $CO_2$ in the rinsed flue gas. The method for treating a flue gas can largely reduce the content of $CO_2$ and $NO_x$ in the flue gas. Besides, the obtained product can be used as a carbon source and nitrogen source for algae cultivation.

13 Claims, 1 Drawing Sheet

(58) Field of Classification Search
CPC .. B01D 53/83; B01D 53/8625; B01D 53/508;
Y02A 50/20
See application file for complete search history.

(56) References Cited

U.S. PATENT DOCUMENTS

| | | | |
|---|---|---|---|
| 9,630,866 | B2 | 4/2017 | Fritz et al. |
| 11,434,466 | B2 | 9/2022 | Rong et al. |
| 2008/0250715 | A1* | 10/2008 | Cooper ..................... C10L 3/00 |
| | | | 48/197 |
| 2011/0288184 | A1 | 11/2011 | Nardo et al. |
| 2014/0102343 | A1 | 4/2014 | Stallmann et al. |
| 2016/0018159 | A1 | 1/2016 | Naito |
| 2016/0059185 | A1* | 3/2016 | Naito ..................... B01D 53/64 |
| | | | 423/437.1 |
| 2017/0211036 | A1* | 7/2017 | Rong ..................... B01D 53/78 |
| 2020/0230551 | A1* | 7/2020 | Tong ..................... B01J 23/002 |

FOREIGN PATENT DOCUMENTS

| | | | |
|---|---|---|---|
| CN | 104450525 | A | 3/2015 |
| CN | 104630065 | A | 5/2015 |
| CN | 205360917 | U | 7/2016 |
| CN | 106032522 | A | 10/2016 |
| CN | 110479057 | A | 11/2019 |
| CN | 110743340 | A | 2/2020 |
| JP | H07246086 | A | 9/1995 |
| JP | H09136015 | A | 5/1997 |
| JP | 2005211826 | A | 8/2005 |
| JP | 2013529545 | A | 7/2013 |
| WO | 2015041102 | A1 | 3/2015 |

* cited by examiner

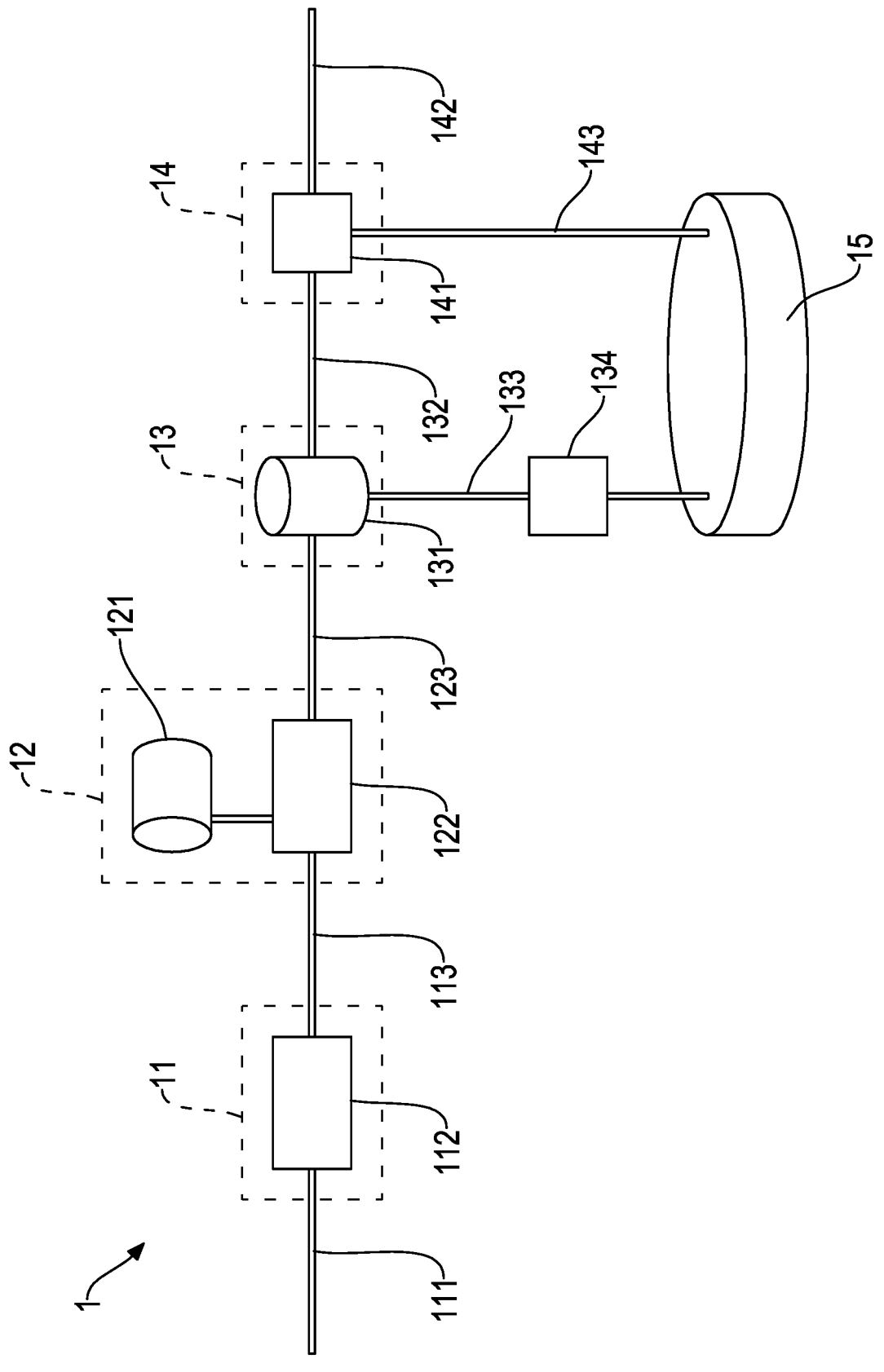

METHOD FOR CAPTURING CARBON DIOXIDE AND NITROGEN OXIDES IN FLUE GAS AND CONVERSION THEREOF TO CARBON SOURCE AND NITROGEN SOURCE NEEDED FOR ALGAE GROWTH

CROSS-REFERENCE TO RELATED APPLICATIONS

This application is based upon and claims priority under 35 U.S.C. 119 from Taiwan Patent Application No. 111150464 filed on Dec. 28, 2022, which is hereby specifically incorporated herein by this reference thereto.

BACKGROUND OF THE INVENTION

1. Field of the Invention

The present invention relates to a method for treating a gas, and particularly to a method for treating contaminant in a flue gas for reutilization.

2. Description of the Prior Arts

With industrial development, the waste gas, emitted from boilers of factories and thermal power plants, etc., increases greatly, which causes severe air pollution. Among them, polluted air comprising sulfur oxides and nitrogen oxides and greenhouse gas, such as carbon dioxide, are largely produced by burning fossil fuel. Once the sulfur oxides and nitrogen oxides are emitted into the air, acid rain will be generated immediately, which will cause soil acidification and affect crop growth. As for carbon dioxide, it is one of the greenhouse gas most responsible for global warming. At present, the Environmental Protection regulation stipulates that the flue gas discharged from chimneys must go through treatment processes such as desulfurization and denitrification before discharging, so that the sulfur oxides and the nitrogen oxides can be reduced to a certain concentration. In the existing technology, a common way to remove nitrogen oxides is to reduce nitrogen oxides into harmless stable nitrogen and release it into the air. However, this method cannot make good use of the discharged waste, which is a pity.

In addition, the emitted waste gas increases the amount of greenhouse gas and strengthens the greenhouse effect, which results in global warming. Thus, the extreme climate increases, floods and droughts frequently happen, and extremely cold and hot climates normalize. These impact the crop harvest and make the ice field melt and sea level rise, seriously affecting the ecology and the environment. Therefore, the reduction of carbon dioxide, the main greenhouse gas, is the goal of the global effort.

In order to solve the problem of carbon dioxide and greenhouse effect, lots of carbon capture, storage and utilization technologies have been developed, including: converting carbon dioxide into various chemical substances, such as acetic acid or polycarbonate (PC) and other chemical plastic products. These methods seem reasonable and can achieve some economic effects from industrial recycling. However, in fact, humans do not consume so many chemical products; therefore, carbon dioxide in the atmosphere still cannot be largely removed.

SUMMARY OF THE INVENTION

Currently, the fossil fuels burned by human beings are organic substances accumulated by photosynthesis of plants since ancient times. These fossil fuels contain a large number of carbon elements and nitrogen elements which are essential to plant growth. If we only utilize the energy of fossil fuels and arbitrarily discharge these large numbers of carbon elements and nitrogen elements, it will not only destroy the natural carbon cycle, but also cause negative effects of pollution and global warming. Therefore, introducing these large numbers of carbon elements and nitrogen elements into natural carbon cycle is the fundamental solution to the pollution and global warming problems that human beings encounter presently.

In view of the fact that the existing technology is unable to reduce a large amount of carbon dioxide in the waste gas discharged after burning fossil fuels, the purpose of the present invention is to capture a large amount of carbon dioxide and nitrogen oxides in the flue gas discharged after burning fossil fuels, and also to convert the captured subjects into other products for subsequent use, such as applying these products to algae cultivation, so that the huge amount of carbon dioxide can return to the natural carbon cycle and be transferred to other layers of carbon cycle rapidly, thereby greatly reducing carbon dioxide in the waste gas, and greatly reducing acid rain generated by nitrogen oxides and its impact on the environment.

To achieve the above purpose, the present invention provides a method for treating a flue gas comprising steps as follows:

step (A): desulfurizing a flue gas to obtain a desulfurized flue gas, wherein the flue gas comprises nitrogen oxides ($NO_x$), sulfur oxides ($SO_x$), and carbon dioxide ($CO_2$), wherein the nitrogen oxides comprise nitric oxide (NO);

step (B): providing oxygen to react with the nitric oxide in the desulfurized flue gas for an oxidation reaction to obtain an oxidized flue gas, wherein the oxidized flue gas comprises nitrogen dioxide ($NO_2$) and carbon dioxide;

step (C): rinsing the oxidized flue gas with water to dissolve nitrogen dioxide in the oxidized flue gas in water to obtain a rinsed flue gas and a nitric acid solution; and step (D): contacting the rinsed flue gas with a basic solution to absorb the carbon dioxide in the rinsed flue gas by the basic solution to obtain a basic-washed flue gas and a weak basic solution, wherein the pH value of the basic solution is from 9.5 to 14, and the pH value of the weak basic solution is from 8 to 9.

In the existing gas treatment methods, the desulfurization and denitrification technology is to decompose nitrogen oxides into nitrogen by catalysts followed by desulfurization treatment, such as wet desulfurization and dry desulfurization. Nitrogen is a stable gas and cannot be absorbed or utilized by plants, and nitrate ion is a form of nitrogen source that plants can directly absorb and utilize. According to the present invention, the flue gas can be preliminarily purified by the desulfurization step to largely reduce sulfur element, which hinders the subsequent algae growth. After that, the processes of oxygen providing and water washing are conducted, so that the nitrogen dioxide obtained by the oxidation of nitrogen oxides in the flue gas can be dissolved in water to form a nitric acid solution, and then the basic solution is contacted with the rinsed flue gas for an acid-base neutralization reaction. Therefore, the present invention can achieve the effect of greatly reducing carbon dioxide and nitrogen oxides in flue gas, reducing greenhouse gas and acid gas emissions, purifying air quality and improving ecology and the environment. Moreover, the products obtained by the treating method of the present invention can be used as carbon source and nitrogen source for subsequent algae cultivation. Consequently, the present invention not only greatly reduces greenhouse gas in waste gas, but also fully utilizes the waste in flue gas. That is, the present invention not only can protect the environment but also has commercial value.

Preferably, the nitrogen oxides may include nitrogen dioxide ($NO_2$).

According to the present invention, sulfur oxide includes, but is not limited to, sulfur dioxide and sulfur trioxide.

According to the present invention, the desulfurized flue gas includes nitric oxide, nitrogen dioxide, and carbon dioxide.

According to the present invention, the sources of the flue gas are, but not restricted to, the waste gas produced from burning coal, natural gas, or fuel oil by thermal power plants, steel mills, concrete plants, petrochemical plants, oil refineries, paper mills, heating plants, etc.

Preferably, the concentration of the sulfur oxides in the flue gas is less than 500 ppm.

Preferably, in the step (B) of the aforementioned method, the volume ratio of the oxygen to nitric oxide is from 1:1.5 to 1:2.0. More preferably, in the step (B) of the aforementioned method, the volume ratio of the oxygen to nitric oxide is from 1:1.7 to 1:1.9, such as, 1:1.8.

Preferably, in the step (B) of the aforementioned method, a catalyst may be used to enhance the oxidation reaction of oxygen reacting with the nitric oxide in the desulfurized flue gas to obtain the oxidized flue gas, wherein the catalyst may be metal or active carbon. More preferably, the metal is gold (Au), silver (Ag), platinum (Pt), palladium (Pd), rhodium (Rh), or ruthenium (Ru), etc.

Preferably, the concentration of the nitric acid solution obtained in the step (C) of the aforementioned method is 50 weight percent (wt %) to 70 wt %. More preferably, the concentration of the nitric acid solution obtained in the step (C) of the aforementioned method is 55 wt % to 65 wt %.

Preferably, the rinsed flue gas obtained from the step (C) of the aforementioned method is continuously oxidized, so that the nitric oxide therein can be used up after several oxidation cycles.

Preferably, the aforementioned method further comprises step (E): adjusting the pH value of the nitric acid solution to 6.5 to 8 to obtain a pH-adjusted nitric acid solution. This pH range makes the pH-adjusted nitric acid solution suitable for adjusting the optimal pH range for microalgae growth in the subsequent steps, and able to provide nitrogen element needed for fast growth of microalgae.

Preferably, the aforementioned method further comprises step (F): adding the weak basic solution and the pH-adjusted nitric acid solution to a microalgae cultivation tank containing microalgae. This can provide the carbon source for microalgae in water for photosynthesis, so that the microalgae can be further processed to produce functional foods, animal feeds and the biodiesel. Besides, the microalgae cultivation solution can be recycled for carbon dioxide adsorption. Thus, the product of the present invention can be effectively used. Preferably, the microalgae cultivation tank containing microalgae contains a microalgae solution, wherein the microalgae solution comprises 0.01 wt % microalgae to 0.5 wt % microalgae. In another embodiment, the weak basic solution (i.e. carbon source) or the pH-adjusted nitric acid solution (i.e. nitrogen source) was dried before adding to the microalgae cultivation tank containing microalgae. Since the nitrogen source or carbon source can be added to the microalgae cultivation tank containing microalgae in a solid form, the drying step makes it easier for transporting the carbon source and the nitrogen source to other places for microalgae cultivation.

Preferably, the weight ratio of addition amount of the weak basic solution (i.e. carbon source) to the pH-adjusted nitric acid solution (i.e. nitrogen source) to the microalgae solution in the microalgae cultivation tank containing microalgae is to 2000:10 to 100:8000 to 20000.

6 Preferably, in the step (E) of the aforementioned method, the sodium hydroxide is added to the nitric acid solution to obtain the pH-adjusted nitric acid solution, wherein the pH-adjusted nitric acid solution is a pH-adjusted sodium nitrate solution. In order to avoid the growth environment of microalgae being too acidic, which results from that a large amount of nitric acid solution is directly added to the microalgae cultivation tank, alkaline substances can be added to the nitric acid solution to adjust the pH range, so that the microalgae can grow in a suitable environment. Adjusting pH with sodium hydroxide can promote the growth of microalgae better than other alkaline substances such as potassium hydroxide, magnesium oxide or calcium carbonate. Take cultivation of cyanobacteria as an example, 2 kilogram (kg) to 4 kg of sodium hydroxide can be added to 3 kg to 5 kg of 70 wt % nitric acid solution, followed by adding to 1 metric ton of microalgae solution, which makes the cyanobacteria have the best growth condition, that is, Cyanobacterial biomass can grow rapidly. More preferably, if 10 kg of $NaHCO_3$ is added as carbon source at the same time, the total biomass of microalgae can be multiplied within 48 hours under proper water flow and sufficient lighting.

Preferably, the aforementioned step (D) includes:

step (D1): preliminarily contacting the rinsed flue gas with the basic solution to absorb the carbon dioxide in the rinsed flue gas by the basic solution to obtain a preliminary basic-washed flue gas and a first weak basic solution, wherein the preliminary basic-washed flue gas comprises the remaining carbon dioxide after preliminary contact; and step (D2): again contacting the preliminary basic-washed flue gas with the basic solution to absorb the carbon dioxide in the preliminary basic-washed flue gas by the basic solution to obtain the basic-washed flue gas and a second weak basic solution, wherein the weak basic solution comprises the first weak basic solution and the second basic weak solution. More preferably, step (D2) can be repeated more than once. For example, when step (D2) is repeated for once, it means the rinsed flue gas is contacted with the fresh basic solution three times sequentially in step (D).

Preferably, the method of desulfurizing may be dry desulfurization. By adopting the dry desulfurization, the problem of sticky wall of semi-dry desulfurization can be avoided. Specifically, sodium bicarbonate powder can be used as a desulfurization agent in the dry desulfurization. Due to the activation of sodium bicarbonate by the high temperature flue gas, microporous structures can be formed on the surface of sodium bicarbonate and can react with sulfur oxides rapidly and fully.

Preferably, the basic solution in the step (D) of the aforementioned method is a sodium hydroxide solution. One of the reasons is that the sodium bicarbonate, which is the product obtained by the reaction of sodium hydroxide and carbon dioxide, does not cause environmental pollution. Besides, it can be collected for further utilization, especially it can be used as a good carbon source and added into the microalgae cultivation tank in step (E).

Preferably, the microalgae is *Botryococcus braunii, Chlorella* sp., *Crypthecodinium cohnii, Cylindrotheca* sp., *Dunaliella primolecta, Isochrysis* sp., *Monalanthus Salina, Nannochloris* sp., *Nannochloropsis* sp., *Neochloris oleoabundans, Nitzschia* sp., *Phaeodactylum tricornutum, Schizochytrium* sp., *Tetraselmis suecica, Arthrospira maxima, Arthrospira platensis*, Cyanobacteria, or of any combination thereof.

Preferably, the step (B) is step (B'): dedusting the desulfurized flue gas and providing oxygen to react with the nitric oxide in the desulfurized flue gas for the oxidation reaction to obtain an oxidized flue gas, wherein the oxidized flue gas comprises the nitrogen dioxide and the carbon dioxide. This step can further purify the flue gas. Specifically, the dust particles in the flue gas and/or the dust particles produced by the aforementioned desulfurization process can be removed. In some embodiments, the particle size of the aforementioned dust particles is above 0.1 micrometer. Preferably, the dedusting step is to filter out the dust particles by a nanofiber tube.

Preferably, in the step (C) of the aforementioned method, the total contacting time of the basic solution with the rinsed flue gas is more than 5 seconds. More preferably, the total contacting time is more than 15 seconds. More preferably, the total contacting time is more than 1 minute.

In the step (D) of the aforementioned method, the higher the concentration of the basic solution, the easier the basic compound in the basic solution would deposit, which results in a stuck tunnel and increases the risk for the operation. However, the lower the concentration of the basic solution, the higher the needed flow rate of the basic solution. In other words, it is relatively energy-wasting. Therefore, preferably, the concentration of the basic solution is from 1 wt % to 50 wt %, but it is not limited to this. In one embodiment, the concentration of the basic solution is 3 wt % to 5 wt %, which is safe in operation and relatively energy-saving. In another embodiment, a high-concentration basic solution is adopted to generate salt crystals. For example, a sodium hydroxide having a concentration greater than 10 wt % can be adopted for spraying to generate sodium bicarbonate crystal, so that the sodium bicarbonate can be transported to other places in a solid form for algae cultivation.

Preferably, the step (D) of the aforementioned method is conducted at a temperature below 90° ° C. This temperature range can prevent the water content, comprised in the basic solution, from evaporating due to the excessively high temperature, and makes the dissolved basic compound deposit partially, resulting in a stuck tunnel for basic solution transportation easily. More preferably, the Step (D) is conducted at the temperature between 4° C. and 90° ° C., since the reaction rate of acid-base neutralization decreases at the temperature below 4° C. Additionally, considering the solubility of the salt, obtained by the reaction of said basic solution and carbon dioxide, more preferably, the step (C) is conducted at a temperature between 50° C. and 60° C.

The present invention further provides a system for treating a flue gas, the system comprising:

a desulfurization part containing a flue gas inlet, a desulfurization reaction unit, and a desulfurized flue gas outlet, wherein the desulfurization reaction unit is respectively in fluid communication with the flue gas inlet and the desulfurized flue gas outlet, wherein the flue gas inlet is for introducing a flue gas into the desulfurization reaction unit, and the flue gas comprises nitrogen oxides such as nitric oxide and nitrogen dioxide, sulfur oxides, and carbon dioxide,

6 the desulfurization reaction unit provides a desulfurization agent for reacting with the sulfur oxides in the flue gas to obtain a desulfurized flue gas, the desulfurized flue gas outlet is for discharging the desulfurized flue gas;

an oxidization part containing an oxygen providing unit, an oxidation reaction unit, and an oxidized flue gas outlet, wherein the oxidation reaction unit is respectively in fluid communication with the desulfurized flue gas outlet, the oxygen providing unit, and the oxidized flue gas outlet, wherein the oxygen providing unit provides oxygen to the oxidation reaction unit for oxidizing the nitric oxide in the desulfurized flue gas to obtain an oxidized flue gas, the oxidized flue gas outlet is for discharging the oxidized flue gas, wherein the oxidized flue gas comprises nitrogen dioxide and carbon dioxide;

a rinsing part containing a rinsing tower and a rinsed flue gas outlet and a nitric acid solution outlet, wherein the rinsing tower is respectively in fluid communication with the oxidized flue gas outlet, the rinsed flue gas outlet and the nitric acid solution outlet, wherein the rinsing tower provides water for rinsing the oxidized flue gas and dissolving the nitrogen dioxide in the oxidized flue gas in water to obtain a rinsed flue gas and a nitric acid solution, the rinsed flue gas outlet is for discharging the rinsed flue gas, the nitric acid solution outlet is for discharging the nitric acid solution; and a basic washing part containing a basic solution spraying unit, a basic-washed flue gas outlet, and a weak basic solution outlet, wherein the basic solution spraying unit is respectively in fluid communication with the rinsed flue gas outlet, the basic-washed flue gas outlet, and a weak basic solution outlet, wherein the basic solution spraying unit provides a basic solution to absorb carbon dioxide in the rinsed flue gas to obtain a basic-washed flue gas and a weak basic solution, the basic-washed flue gas outlet is for discharging the basic-washed flue gas, and the weak basic solution outlet is for discharging the weak basic solution.

Preferably, the oxidation reaction unit is a ceramic fiber filter containing a catalyst. Preferably, the catalyst may be metal or active carbon. More preferably, the metal may be gold (Au), silver (Ag), platinum (Pt), palladium (Pd), rhodium (Rh), or ruthenium (Ru).

Preferably, a nitric oxide detection valve is mounted on the rinsed flue gas outlet, wherein the nitric oxide detection valve connects to the oxidation unit through a circulating pipe and can detect the concentration of nitric oxide in the rinsed flue gas outlet, and in the case that the concentration of nitric oxide in the rinsed flue gas outlet is higher than 10 ppm, the rinsed flue gas will be reintroduced to the oxidation reaction unit.

Preferably, the nitric acid solution outlet is further in fluid communication with a pH adjustment unit. The pH adjustment unit provides sodium hydroxide for adjusting the pH value of the nitric acid to provide the optimal condition for algae growth.

The advantage of the present invention is to retain nitrogen oxides in the flue gas by means of desulfurization without denitration. Then the nitrogen dioxide is dissolved in water by the steps of oxygen treatment and water rinsing to form the nitric acid solution, and then the basic solution is contacted with the rinsed flue gas for an acid-base neutralization reaction. Therefore, the present invention can achieve the effect of greatly reducing carbon dioxide and nitrogen oxides in flue gas, reducing greenhouse gas emissions, purifying air quality and improving ecology and environment. Moreover, the products obtained by the treating method of the present invention can be used as carbon source and nitrogen source for subsequent algae cultivation. Consequently, the present invention not only greatly reduces greenhouse gases in waste gas, but also fully utilizes the waste in flue gas. That is to say, the present invention not only can protect the environment but also has commercial value.

BRIEF DESCRIPTION OF THE DRAWING

FIG. 1 is a schematic diagram of the system for treating flue gas of Example 2 of the present invention.

DETAILED DESCRIPTION OF THE PREFERRED EMBODIMENTS

The present invention is further explained through the following embodiments. The present invention should not be limited to the contents of the embodiments. A person having ordinary skill in the art can do some improvement or modifications which are not departing from the scope of the present invention.

Example 1 Method for Treating a Flue Gas

First, in step (A): a flue gas was desulfurized to obtain a desulfurized flue gas. Specifically, an emitted flue gas collected from the high-temperature boilers of steelmaking comprising nitric oxide, nitrogen dioxide, sulfur oxide, carbon dioxide, and dust particles were dry-desulfurized by sodium bicarbonate to obtain a desulfurized flue gas, wherein the desulfurized flue gas comprises dust particles, nitric oxide, nitrogen dioxide and carbon dioxide.

Next, in step (B'): the desulfurized flue gas was dedusted, and oxygen was provided to react with the nitric oxide in the desulfurized flue gas for an oxidation reaction to obtain an oxidized flue gas. Specifically, the desulfurized flue gas was dedusted by passing through a ceramic fiber filter coated with a platinum metal catalyst. Then the oxygen was provided to react with the nitric oxide in the desulfurized flue gas for oxidation reaction to obtain an oxidized flue gas, wherein the oxidized flue gas comprises nitrogen dioxide and carbon dioxide. Besides, the volume ratio of oxygen provided to nitric oxide in the flue gas is 1:1.5 and the fully contacting time of gas and catalyst for reaction was 0.04 second (sec) to 1 sec.

Then, in step (C), the oxidized flue gas was rinsed with water to dissolve nitrogen dioxide in the oxidized flue gas in water to obtain a rinsed flue gas and a nitric acid solution. Specifically, the oxidized flue gas was rinsed with water spraying to dissolve nitrogen dioxide in the oxidized flue gas in water to obtain a 70 wt % nitric acid solution and a rinsed flue gas.

After that, in step (D1) the rinsed flue gas, having a flow rate of 330 m³/hr, was preliminarily contacted with a 2 wt % sodium hydroxide solution, having a flow rate of 500 L/hr, in the way of co-current flow. The preliminary contact was a circulation spray lasting for 5 seconds. In the meantime, the flow rate ratio of the basic solution to the gas was 1:660. Said circulation spray refers to the rinsed flue gas sprayed by a circulated sodium hydroxide solution in a chamber, so that the carbon dioxide in the rinsed flue gas was absorbed by the sodium hydroxide solution, to obtain a preliminary basic-washed flue gas and a first sodium hydrogen carbonate solution, wherein the preliminary basic-washed flue gas comprises the remaining carbon dioxide after preliminary contact; and step (D2): the preliminary basic-washed gas, having a flow rate of 330 m³/hr, was "again contacted" with the 2 wt % sodium hydroxide solution, having a flow rate of 500 L/hr, in the way of co-current flow. Besides, the term "again contacting" refers to a circulation spray lasting for 5 seconds, resulting in a second sodium hydrogen carbonate solution and a second basic-washed gas. After that, step (D2) was repeated once, in order to obtain the third sodium hydrogen carbonate solution and a basic-washed gas. The first sodium hydrogen carbonate solution, second sodium hydrogen carbonate solution and third sodium hydrogen carbonate solution, obtained from the three stages of contacting, were collected together into a storage pool, and the pH value of sodium hydrogen carbonate solution in the storage pool was measured to be 8 to 9, while the concentration of the sodium hydrogen carbonate solution in the storage pool was about 0.5 to 2 wt %. Therefore, in step (D), the rinsed flue gas was separately contacted with 2 wt % sodium hydroxide solution for three times sequentially, so that the carbon dioxide in the flue gas was mostly absorbed by the sodium hydroxide solution. Finally, a basic-washed flue gas was obtained. The content of carbon dioxide of the basic-washed flue gas was detected by a carbon dioxide detector and the result thereof showed that the content of carbon dioxide largely reduced compared to the original flue gas.

In step (D), when the sodium hydroxide solution contacted the carbon dioxide, the acid-base neutralization reacted immediately. Besides, by contacting the rinsed flue gas with the basic solution in the way of co-current flow, the contacting time of the sodium hydroxide solution with the carbon dioxide was extended. Therefore, the acid-base neutralization can fully react.

Next, in step (E): the sodium hydroxide was added to the nitric acid to obtain a pH-adjusted nitric acid solution. Specifically, the addition amount of sodium hydroxide depended on the amount of the microalgae solution in the subsequent microalgae cultivation step. In the present embodiment, 3.3 kg sodium hydroxide was added to 5.29 kg 70 wt % nitric acid solution to obtain a pH-adjusted sodium nitrate solution with a pH value from 7 to 7.5.

Finally, in step (F): the weak basic solution and the pH-adjusted sodium nitrate solution were added to a microalgae cultivation tank containing microalgae. Specifically, every 7 days, 25 kg pH-adjusted sodium nitrate solution obtained from step (E) was added to a microalgae cultivation tank containing 10 metric ton microalgae solution as nitrogen source. Meanwhile, 0.5 wt % to 2 wt % sodium bicarbonate obtained from step (D) was dried to obtain solid sodium bicarbonate and then 95 kg solid sodium bicarbonate was added to said microalgae cultivation tank containing 10 metric ton microalgae solution as carbon source every 7 days. In the present embodiment, a sodium nitrate solution with specific pH value obtained by adding specific amount of sodium hydroxide in step (E), and the specific addition amount of pH-adjusted sodium nitrate solution and sodium bicarbonate solution in step (F) can make cyanobacteria grow optimally, so that harvested microalgae powder can be maximum: 34.5 kg harvested microalgae powder every 7 days. Compared with the better addition amount of pH-adjusted sodium nitrate solution and sodium bicarbonate solution, if the addition amount of the nitrogen source and carbon source is not controlled in the optimal range, the produced microalgae powder would be less, which is only about $1/10$ of the present invention, that is, 10 metric tons of algae water can only produce about 3 to 3.78 kg of microalgae powder. Generally, the weight of dried microalgae powder is about 1/3500-1/2500 of the wet weight of microalgae solution after 7 days of cultivation.

Example 2 System for Treating a Flue Gas

FIG. 1 is a schematic diagram of the system for treating flue gas of the present example, wherein the double solid line indicates the pipeline where liquid or gas flows.

As shown in FIG. 1, the system for treating flue gas 1 of the present invention comprises: a desulfurization part 11, an oxidization part 12, a rinsing part 13 and a basic washing part 14, wherein the desulfurization part 11 contains a flue gas inlet 111, a desulfurization reaction unit 112 and a desulfurized flue gas outlet 113, wherein the desulfurization reaction unit 112 is respectively in fluid communication with the flue gas inlet 111 and the desulfurized flue gas outlet 113. The flue gas inlet 111 is for introducing a flue gas into the desulfurization reaction unit 112, wherein the flue gas comprises nitrogen oxides, such as nitric oxide and nitrogen dioxide, sulfur oxides, and carbon dioxide. The desulfurization reaction unit 112 provides a desulfurization agent for reacting with the sulfur oxides in the flue gas to obtain a desulfurized flue gas. The desulfurized flue gas outlet 113 is for discharging the desulfurized flue gas.

The oxidization part 12 contains an oxygen providing unit 121, an oxidation reaction unit 122, and an oxidized flue gas outlet 123, wherein the oxidation reaction unit 122 is respectively in fluid communication with the desulfurized flue gas outlet 113, the oxygen providing unit 121, and the oxidized flue gas outlet 123. The oxygen providing unit 121 provides oxygen to the oxidation reaction unit 122 for oxidizing the nitric oxide in the desulfurized flue gas to obtain an oxidized flue gas, which is discharged from the oxidized flue gas outlet 123, wherein the oxidized flue gas comprises nitrogen dioxide and carbon dioxide The rinsing part 13 contains a rinsing tower 131, a rinsed flue gas outlet 132, and a nitric acid solution outlet 133, wherein the rinsing tower 131 is respectively in fluid communication with the oxidized flue gas outlet 123, the rinsed flue gas outlet 132 and the nitric acid solution outlet 133. The rinsing tower 131 provides water for rinsing the oxidized flue gas and dissolving the nitrogen dioxide in the oxidized flue gas in water to obtain a rinsed flue gas and a nitric acid solution. The rinsed flue gas outlet 132 is for discharging the rinsed flue gas. The nitric acid solution outlet 133 is for discharging the nitric acid solution. In other embodiments, the nitric acid solution outlet 133 is in fluid communication with a pH adjustment unit 134, which can adjust the pH value of the nitric acid solution.

The basic washing part 14 contains a basic solution spraying unit 141, a basic-washed flue gas outlet 142, and a weak basic solution outlet 143, wherein the basic solution spraying unit 141 is respectively in fluid communication with the rinsed flue gas outlet 132, the basic-washed flue gas outlet 142, and a weak basic solution outlet 143. The basic solution spraying unit 141 provides a basic solution to absorb carbon dioxide in the rinsed flue gas to obtain a basic-washed flue gas and a weak basic solution. The basic-washed flue gas outlet 142 is for discharging the basic-washed flue gas, and the weak basic solution outlet 143 is for discharging the weak basic solution.

The method of utilizing the system for treating flue gas of the present invention is stated as follows:

First, an emitted flue gas collected from the high-temperature boilers of steelmaking was introduced to the desulfurization part 11 through the flue gas inlet 111; wherein the flue gas comprised nitrogen oxides such as nitric oxide and nitrogen dioxide, sulfur oxides, carbon dioxide. The sulfur oxides in the flue gas were absorbed by the desulfurization agent: sodium bicarbonate powders in the desulfurization reaction unit 112, so that a desulfurized flue gas was obtained.

Next, the desulfurized flue gas was introduced to the oxidation reaction unit 122 in the oxidization part 12 through the desulfurized flue gas outlet 113. The oxygen was provided from the oxygen providing unit 121 to the oxygen reaction unit 122, so that the nitric oxide in the desulfurized flue gas was oxidized and an oxidized flue gas was obtained.

Then, the oxidized flue gas was introduced to the rinsing tower 131 in the rinsing part 13 through the oxidized flue gas outlet 123, wherein the rinsing tower 131 provides water for rinsing the oxidized flue gas, so that the nitrogen dioxide in the oxidized flue gas was dissolved in water and a rinsed flue gas and a nitric acid solution were obtained. The nitric acid solution can be introduced to a cultivation tank 15 containing microalgae via a nitric acid solution outlet 133 for algae cultivation. In another embodiment, sodium hydroxide can be provided to the nitric acid solution by pH adjustment unit 134, so that the pH value of the nitric acid solution can be adjusted to pH 6.5 to 8, which can be introduced to the cultivation tank 15 containing microalgae through the nitric acid solution outlet for algae cultivation.

Finally, the rinsed flue gas was introduced to a basic solution spraying unit 141 in the basic washing part 14 via the rinsed flue gas outlet 132 for absorbing carbon dioxide. Specifically, the carbon dioxide in the rinsed flue gas was absorbed by the basic solution provided by the basic solution spraying unit 141, and a weak basic solution and a basic-washed flue gas were obtained. In the present embodiment, the basic solution adopted in the basic solution spraying unit 141 was sodium hydroxide solution, so the weak basic solution obtained was sodium bicarbonate solution, which can be used as a carbon source for microalgae cultivation. Said sodium bicarbonate solution was introduced to the cultivation tank 15 containing microalgae via the weak basic solution outlet 143 for microalgae cultivation. The basic basic-washed flue gas, the carbon dioxide in which was largely decreased after detected by a detector, can be discharged via the basic-washed flue gas outlet 142. After the step (D) was conducted, the carbon dioxide removal rate can be almost 90%.

To sum up, the method for treating flue gas and using the system for treating flue gas can effectively absorb carbon dioxide and nitrogen oxides. Besides, the weak basic solution and the nitric acid solution obtained from the system for treating flue gas can be used as carbon source and nitrogen source respectively for microalgae cultivation.

The above embodiments are only preferred embodiments of the present invention, not intended to limit the present invention in any aspect. It is apparent to those skilled in the art that various modifications and variations can be made without departing from the scope and spirit of the invention. Although the present invention has been described in terms of specific preferred embodiments, it should be understood that the invention should not be unduly limited to those specific embodiments. In fact, the various modifications that are obvious to those of ordinary skill in the art are also encompassed within the scope of the following claims.

What is claimed is:

1. A method for treating a flue gas, comprising:

step (A): desulfurizing a flue gas to obtain a desulfurized flue gas, wherein the flue gas comprises nitrogen oxides, sulfur oxides, and carbon dioxide, wherein the nitrogen oxides comprise nitric oxide;

step (B): providing oxygen to react with the nitric oxide in the desulfurized flue gas for an oxidation reaction to obtain an oxidized flue gas, wherein the oxidized flue gas comprises nitrogen dioxide and carbon dioxide;

step (C): rinsing the oxidized flue gas with water to dissolve nitrogen dioxide in the oxidized flue gas in water to obtain a rinsed flue gas and a nitric acid solution;

step (D): contacting the rinsed flue gas with a basic solution to absorb the carbon dioxide in the rinsed flue gas by the basic solution to obtain a basic-washed flue gas and a weak basic solution, wherein the pH value of the basic solution is from 9.5 to 14, and the pH value of the weak basic solution is from 8 to 9; and step (E): adjusting the pH value of the nitric acid solution to 6.5 to 8 by adding sodium hydroxide to obtain a pH-adjusted sodium nitrate solution.

2. The method as claimed in claim 1, wherein in the step (D), the basic solution is a sodium hydroxide solution.

3. The method as claimed in claim 1, wherein a total contacting time of the basic solution with the rinsed flue gas is more than 5 seconds.

4. The method as claimed in claim 1, wherein the step (D) is conducted at a temperature below 90° C.

5. The method as claimed in claim 1, wherein in the step (D), a concentration of the basic solution is from 1 wt % to 50 wt %.

6. The method as claimed in claim 1, wherein in the step (A), the desulfurizing is dry desulfurizing.

7. The method as claimed in claim 1, wherein the step (B) is step (B'), dedusting the desulfurized flue gas and providing oxygen to react with the nitric oxide in the desulfurized flue gas for the oxidation reaction to obtain the oxidized flue gas, wherein the oxidized flue gas comprises the nitrogen dioxide and the carbon dioxide.

8. The method as claimed in claim 1, wherein the method further comprises step (F): adding the weak basic solution and the pH-adjusted sodium nitrate solution to a microalgae cultivation tank containing microalgae.

9. The method as claimed in claim 8, wherein the microalgae is *Botryococcus braunii, Chlorella* sp., *Cryptheco-dinium cohnii, Cylindrotheca* sp., *Dunaliella primolecta, Isochrysis* sp., *Monalanthus Salina, Nannochloris* sp., *Nannochloropsis* sp., *Neochloris oleoabundans, Nitzschia* sp., *Phaeodactylum tricornutum, Schizochytrium* sp., *Tetraselmis suecica, Arthrospira maxima, Arthrospira platensis,* Cyanobacteria, or of any combination thereof.

10. The method as claimed in claim 9, wherein a total contacting time of the basic solution with the rinsed flue gas is more than 5 seconds.

11. The method as claimed in claim 9, wherein the step (D) is conducted at a temperature below 90° C.

12. The method as claimed in claim 9, wherein in the step (D), a concentration of the basic solution is from 1 wt % to 50 wt %.

13. The method as claimed in claim 9, wherein in the step (A), the desulfurizing is dry desulfurizing.

* * * * *